(12) United States Patent
Negre

(10) Patent No.: US 12,059,761 B2
(45) Date of Patent: Aug. 13, 2024

(54) PLATFORM FOR CONVEYING WORK PARTS IN AN ASSEMBLY LINE, AND METHOD FOR PLACING WORK PARTS ON THE SAME

(71) Applicant: ABB Schweiz AG, Baden (CH)

(72) Inventor: Bernard Negre, Paris (FR)

(73) Assignee: ABB SCHWEIZ AG, Baden (CH)

( * ) Notice: Subject to any disclaimer, the term of this patent is extended or adjusted under 35 U.S.C. 154(b) by 160 days.

(21) Appl. No.: 17/631,241

(22) PCT Filed: Jul. 29, 2019

(86) PCT No.: PCT/EP2019/070305
§ 371 (c)(1),
(2) Date: Jan. 28, 2022

(87) PCT Pub. No.: WO2021/018373
PCT Pub. Date: Feb. 4, 2021

(65) Prior Publication Data
US 2022/0266401 A1    Aug. 25, 2022

(51) Int. Cl.
*B23P 21/00* (2006.01)
*B25B 11/00* (2006.01)
(Continued)

(52) U.S. Cl.
CPC ............ *B23P 21/004* (2013.01); *B25B 11/00* (2013.01); *B25H 1/18* (2013.01); *B62D 65/022* (2013.01);
(Continued)

(58) Field of Classification Search
CPC ........ G05B 19/41895; B65G 47/22–24; B65G 11/023; B65G 11/16; B65G 11/203;
(Continued)

(56) References Cited

U.S. PATENT DOCUMENTS 2,504,947 A * 4/1950 Grange ................... B65B 27/06
248/176.1
3,622,145 A * 11/1971 Gibson ................ B23Q 16/001
269/297
(Continued)

FOREIGN PATENT DOCUMENTS

CN      102642130 A    8/2012
CN      203064779 U    7/2013
(Continued)

OTHER PUBLICATIONS

International Search Report and Written Opinion for International Application No. PCT/EP2019/070305, mailed Apr. 7, 2020, 13 pages.

*Primary Examiner* — Matthew P Travers
(74) *Attorney, Agent, or Firm* — McCarter & English, LLP

(57) ABSTRACT

Disclosed herein is a platform for conveying a plurality of work parts in a sequence of manufacturing stations, the platform being mobile and including an inclined surface, and a set of two elements, one element of the set extending along a first plane and another element of the set extending along a second plane, an intersection of the first plane with the inclined surface defining a first direction, an intersection of the second plane with the inclined surface defining a second direction, the first direction and the second direction delimiting an angular sector, so that a work part placed on the inclined surface within the angular sector is driven by its weight downwards with respect to a slope of the inclined plane towards an intersection of the first direction and the second direction.

12 Claims, 3 Drawing Sheets

(51) Int. Cl.
*B25H 1/18* (2006.01)
*B62D 65/02* (2006.01)
*B62D 65/18* (2006.01)
*G05B 19/418* (2006.01)

(52) U.S. Cl.
CPC .......... *B62D 65/18* (2013.01); *B23P 2700/50* (2013.01); *G05B 19/41895* (2013.01)

(58) Field of Classification Search
CPC ........... B25H 1/18; B25B 11/00; B25B 11/02; B62D 65/022; B62D 65/18; B23P 21/004; Y10S 269/902; B23Q 3/104; B23Q 3/186; B62B 3/10
USPC ......................................................... 269/305
See application file for complete search history.

(56) References Cited

U.S. PATENT DOCUMENTS

| | | | |
|---|---|---|---|
| 3,828,915 A | 8/1974 | Cox et al. | |
| 6,269,938 B1 | 8/2001 | Lutz | |
| 2004/0109385 A1* | 6/2004 | Wisniewski | A61M 1/025 366/208 |
| 2008/0000068 A1 | 1/2008 | Savoy et al. | |
| 2013/0256090 A1* | 10/2013 | Heitplatz | B65G 11/023 193/2 R |
| 2015/0020369 A1* | 1/2015 | Ryan | B25B 11/02 451/527 |
| 2016/0009495 A1* | 1/2016 | Sinclair | B65G 11/023 193/2 D |
| 2019/0129371 A1 | 5/2019 | Wagner et al. | |

FOREIGN PATENT DOCUMENTS

| | | | | |
|---|---|---|---|---|
| CN | 203484558 U | * | 3/2014 | |
| CN | 103769488 A | * | 5/2014 | |
| CN | 103998179 A | | 8/2014 | |
| CN | 205415310 U | * | 8/2016 | |
| CN | 107150888 A | | 9/2017 | |
| CN | 108246840 A | * | 7/2018 | |
| CN | 207932427 U | | 10/2018 | |
| CN | 109201910 A | * | 1/2019 | ............ B21C 51/00 |
| CN | 209021926 U | | 6/2019 | |
| FR | 2656856 A1 | | 7/1991 | |
| JP | S62110579 A | | 5/1987 | |
| JP | 2000025911 A | | 1/2000 | |
| JP | 2010058853 A | | 3/2010 | |
| JP | 2015140209 A | | 8/2015 | |
| WO | 2019020199 A2 | | 1/2019 | |

* cited by examiner

PLATFORM FOR CONVEYING WORK PARTS IN AN ASSEMBLY LINE, AND METHOD FOR PLACING WORK PARTS ON THE SAME

CROSS-REFERENCE TO RELATED APPLICATIONS

This application is a National Stage Entry of PCT/EP2019/070305, filed Jul. 29, 2019 and titled "PLATFORM FOR CONVEYING WORK PARTS IN AN ASSEMBLY LINE, AND METHOD FOR PLACING WORK PARTS ON THE SAME", which is hereby incorporated by reference in its entirety.

BACKGROUND

This disclosure relates to the field of industrial manufacturing, more specifically to a flexible mobile platform configured to host a plurality of work parts with different shapes.

It is known in automotive industry, as described in document WO19020199, to use a unique mobile platform to convey a complete set of automotive work parts from a workstation to another workstation within an assembly line including several workstations, wherein different work parts are successively assembled together, and wherein the assembly could be put back on the platform among other work parts, until a final or an intermediate assembly is produced at the end of the assembly line process.

The first step of such a process is a configuration step, wherein the mobile platform is prepared before it is loaded with the set of work parts. The configuration step consists in providing specific supports elements on the platform, each of these specific supports elements being dedicated to support specific work parts to be loaded on the platform.

But, each new automotive model could require a different and specific platform configuration process, based on the specific work parts involved in the assembly of the new automotive model. Therefore, the specificity of the different supports elements which are installed on the platform during the configuration step makes it a complicated and costly step.

Therefore, there is a need to simplify the configuration step.

BRIEF DESCRIPTION

Embodiments of the present disclosure provide a platform for conveying a plurality of work parts in a sequence of manufacturing stations, the platform being mobile and including an inclined surface, and a set of two elements, each element of the two elements being attached to the inclined surface, one element of the set extending along a first plane and another element of the set extending along a second plane, the first plane and the second plane crossing the inclined surface, an intersection of the first plane with the inclined surface defining a first direction, the first direction being oriented upwards with respect to a slope of the inclined surface, an intersection of the second plane with the inclined surface defining a second direction, the second direction being oriented upwards with respect to the slope of the inclined surface, the first direction and the second direction delimiting an angular sector, so that a work part placed on the inclined surface within the angular sector is driven by its weight downwards with respect to the slope of the inclined plane towards an intersection of the first direction and the second direction.

According to these provisions, different work parts repeatedly dropped on the inclined surface within the angular sector will take a final repeatable position without any specific referencing support.

Embodiments of the present disclosure include one or more of the following features, alone or in any combination technically compatible.

According to an embodiment, the angle formed inside the angular sector is greater than 0 degree, and less than 180 degrees, and may be between 20 degrees and 160 degrees, between 60 degrees and 120 degrees, or even between 80 degrees and 100 degrees.

According to an embodiment, a vertical plane intersects the inclined surface along a third direction oriented upwards with respect to the inclination of the inclined surface, the third direction being within the angular sector.

According to an embodiment, a first oriented angle between the third direction and the first direction and a second oriented angle between the third direction and the second direction, are of opposite signs with respect to an angular orientation.

According to this provision, the work part is more efficiently driven by its weight downwards, towards the intersection of the first direction and the second direction.

According to an embodiment, the first direction and the third direction form a first angle and the second direction and the third direction form a second angle, at least one of or both of the first angle absolute value and the second angle absolute being strictly less than 90 degrees, and in some embodiments being less than 60 degrees.

According to these provisions, the set of at least two elements constitutes a generic set of supporting elements, adapted to accommodate for the positioning of work parts with a great variety of shapes. The work part will be resting stable on the inclined surface and against the first extension plane of one element of the set and against the second extension plane of another element at the set of at least two elements, whatever the shape of the work part. Thus, the platform configuration does not need to be changed when a new model, with new work parts, is assembled. With the platform according to embodiments of the present disclosure, there is no more need for pins and machined locators placed on tooling supports. Bended sheet metal, simple blocks, and any material which decreases friction are enough to reduce tooling platform configuration, facilitate simple positioning, and reduce costs. Furthermore, this generic set of at least two elements can accommodate for a positioning of the work parts, which does not need to be very accurate, since it is configured so that by the effect of gravity the work part will be driven to the bottom of the hollow of the angular sector, even if its placement inside the angular sector is not precisely determined.

According to an embodiment, the platform includes at least two inclined surfaces, and at least two sets of two elements, each element of at least one set being attached to one of the at least two inclined surfaces and each element of at least another set being attached to another of the at least two inclined surfaces.

According to an embodiment, the inclined plane and/or each element of the set of two elements is (are) configured to enhance the sliding of a work part downwards along the inclined plane and/or along each element, when said work part is placed on the inclined plane.

According to an embodiment, the inclined plane and/or each element of the set of two element have a smooth surface with which the work parts are in contact when the work parts are placed on the inclined plane.

According to an embodiment, the inclined plane and/or each element of the set of two elements is (are) coated with a material having a coefficient of friction which is function of an inclination of the inclined plane and of another material composing the work parts.

According to an embodiment, the inclined plane and/or each element of the set of two elements include rolling rollers or rolling balls.

According to an embodiment, the platform is subjected to vibrations which enhance sliding of a work part downwards along the inclined plane and/or along each element of the set of two elements, when said work part is placed on the inclined plane.

According to an embodiment, the vibrations are generated by the displacement of the platform on a rough surface, which may be pavement.

According to an embodiment, the platform is autoguided.

According to an embodiment, the sequence of manufacturing stations is an automotive manufacturing assembly line.

According to another aspect, the disclosure provides a method for positioning work parts on a platform according to anyone of the preceding claims, the method including the following steps:
- grab a work part from a storing place;
- place the work part on the inclined surface within the angular sector, so that the work part is driven by its weight downwards with respect to the slope of the inclined surface towards an intersection of the first direction and the second direction;
- In a manufacturing station, grab the work part from the platform in a repeatable known position determined by the inclined surface and the first direction and the second direction.

BRIEF DESCRIPTION OF THE DRAWINGS

The foregoing and other purposes, features, aspects, and advantages of embodiments of the present disclosure will become apparent from the following detailed description of embodiments, given by way of illustration and not limitation with reference to the accompanying drawings, in which the same reference refer to similar elements or to elements having similar functions, and in which.

DETAILED DESCRIPTION

Figure 1:
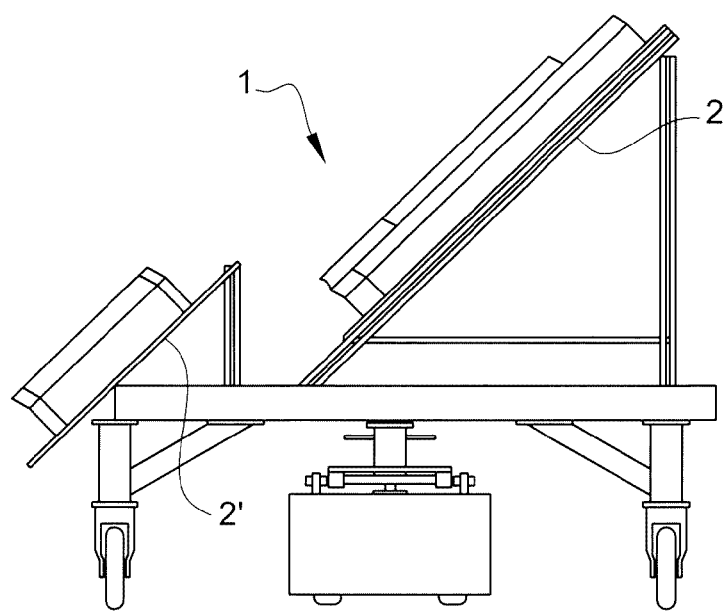
FIG. 1 is a simplified side view of a platform according to an embodiment of the present disclosure.
Figure 2:
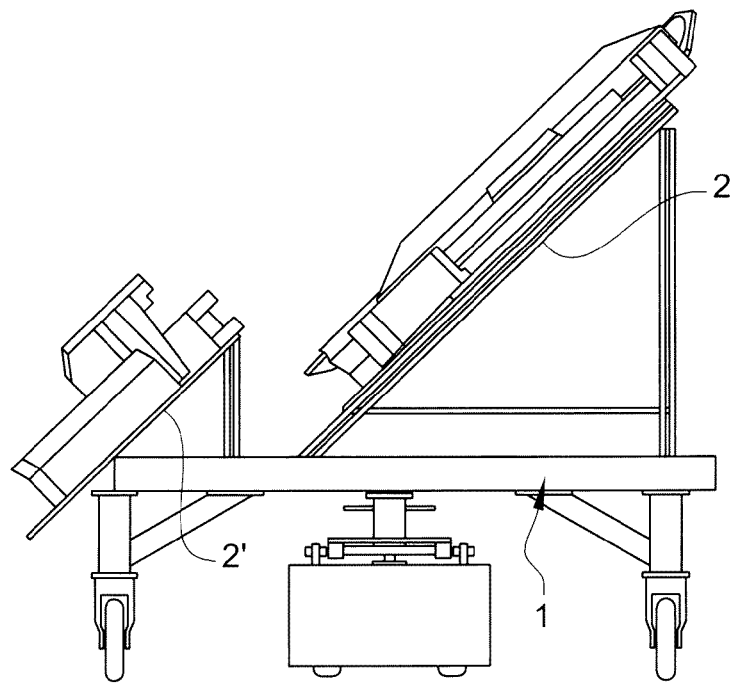
FIG. 2 is a same side view of a platform, conveying work parts, according to an embodiment of the present disclosure.
Figure 3:
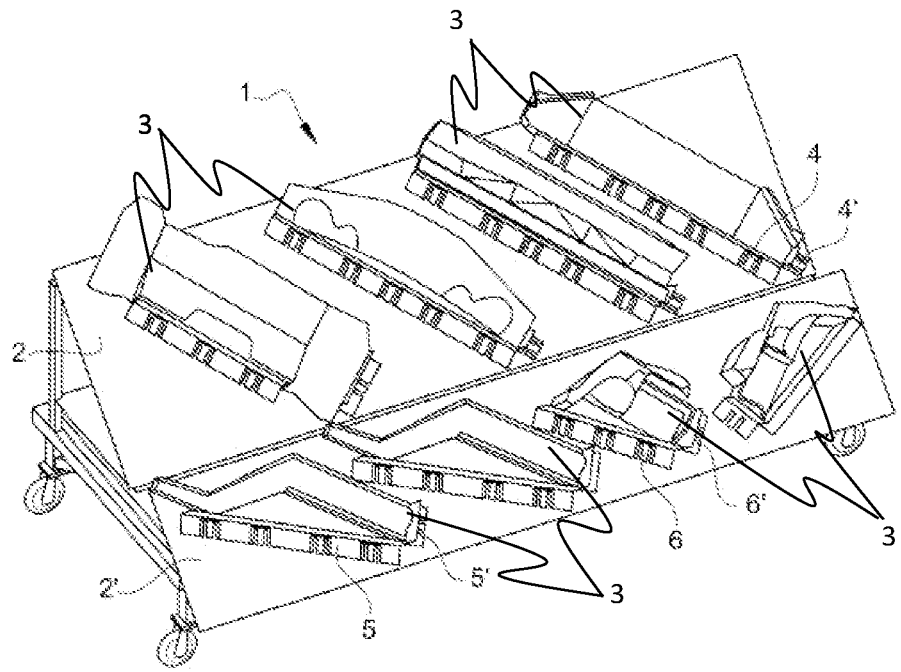
FIG. 3 is a top view of a platform, conveying work parts, according to an embodiment of the present disclosure.

According to an embodiment of the disclosure illustrated in FIGS. 1, 2 and 3, the platform 1 is configured to convey work parts 3 to be assembled at different workstations of an assembly line. The platform 1 may be a mobile platform that may be autoguided.

The work parts 3 being conveyed on the platform are each positioned on the platform so as to be maintained on the platform at a given position.

To that effect, the platform includes at least one inclined plane 2, 2', the work parts being positioned on one of the inclined planes.

On each of the inclined planes 2, 2' are fixed different sets of two elements; in FIG. 3, one such set of two elements is represented, including two elements 4, 4'; a second such set including two elements 5, 5', and a third set including two elements 6, 6', are also represented. Each element of these sets is protruding transversally from the inclined plane, in such a way that each element is an obstacle for an object sliding downwards along the inclined plane 2, 2'.

Figure 4:
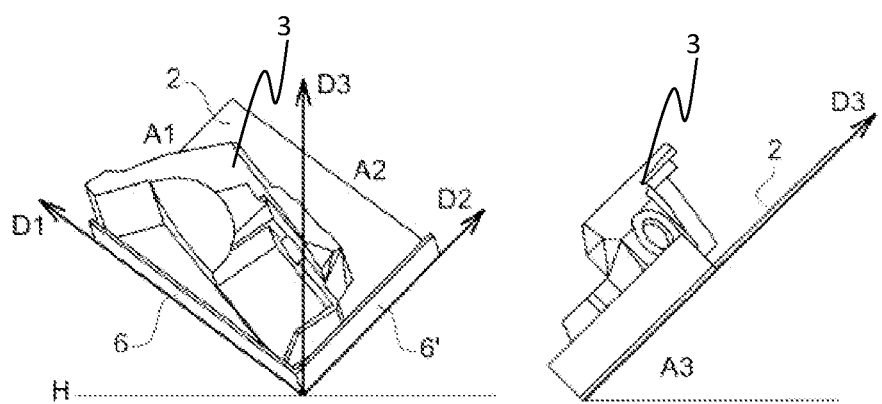
FIG. 4 is a front view and a side view of an angular sector S formed on the inclined plane by a set of at least two elements, at least one element of which extends along a first plane intercepting the inclined plane along a first direction D1, and at least one other element of which extends along a second plane intercepting the inclined plane along a second direction D2.
Figure 5:
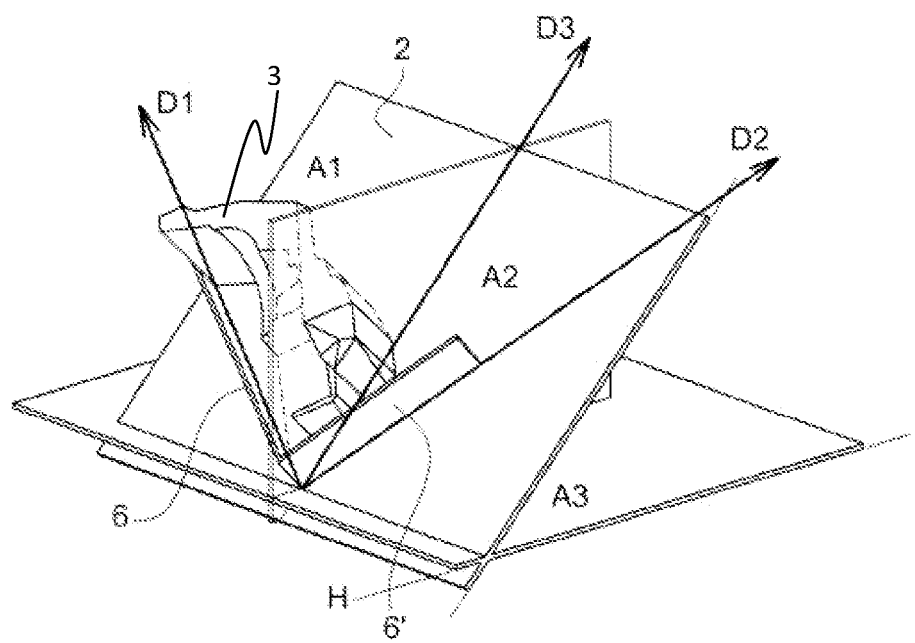
FIG. 5 is a perspective view of the same as FIG. 4.
Figure 6:
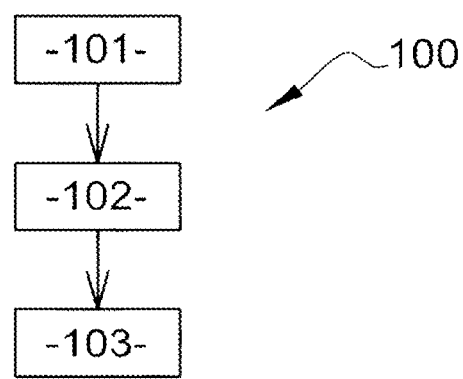
FIG. 6 is a schematic representation of a method according to an embodiment of the present disclosure.

An element 6 of a set of at least two elements 6, 6', is extending along a first plane of extension, said first plane of extension being transverse to the inclined plane, so that the first plane of extension and the inclined plane intersect along a first direction D1, as illustrated in FIGS. 4 and 5. The first direction D1 is oriented in an upward direction with respect to the slope of the inclined plane, as indicated in FIGS. 4 and 5, where a horizontal direction H on the inclined plane 2, 2' is represented, as well as an upward direction D3 of steepest slope. The direction D3 can be defined as the intersection of a vertical plane, i.e. a plane transverse to the horizontal direction H, with the inclined plane 2, 2'. An oriented angle A1 is defined between direction D3 and direction D2.

Another element 6' of the same set of at least two elements 6, 6', is extending along a second plane of extension, said second plane of extension intersecting the inclined plane along a second direction D2, as illustrated in FIGS. 4 and 5. The second direction D2 is oriented in an upward direction with respect to the slope of the inclined plane, so that an oriented angle A2 is defined between direction D3 and direction D2, and an angular sector S is formed between D1 and D2.

According to an embodiment, the direction D3 of steepest slope is within the angular sector S, i.e. oriented angle A1 and oriented angle A2 are of opposite signs with respect to a given angular orientation.

Due to the inclination of the inclined plane, if a work part is placed on the inclined plane within the angular sector S formed by the first and second direction D1 and D2 determined respectively by one and the other element of the set of at least two elements 6, 6', then said work part will naturally slide down to the bottom of the angular sector in the direction of the intersection of the first D1 and second D2 directions, so that said work part will be clamped between and supported by the two elements 6, 6' protruding from the inclined plane.

In order to enhance the clamping mechanism, it may be provided that at least one or both of angle A1 absolute value and angle A2 absolute value is strictly less than 90 degrees. Advantageously, one or both of angle A1 absolute value and angle A2 absolute value is less than 60 degrees.

According to an embodiment, the inclined plane and/or each element of the set of two elements is (are) configured to enhance the sliding of an object downwards along the inclined plane and/or along each element, said object being placed on the inclined plane. For example, the surface of the inclined plane 2, 2' and/or of the elements of the sets of elements 4, 4',5, 5', 6, 6' attached to the inclined plane 2, 2' may be coated with some material having a coefficient of friction, the coefficient of friction being function of the inclination of the inclined plane, and of the material composing the work parts; or the surface of the inclined plane 2, 2' and/or of the elements of the sets of elements 4, 4', 5, 5', 6, 6' attached to the inclined plane 2, 2' may include rolling rollers or rolling balls.

According to an embodiment, the platform is subjected to vibrations which enhance sliding of an object downwards along the inclined plane 2, 2' and/or along each element of the sets of two elements 4, 4', 5, 5', 6, 6', said object being placed on the inclined plane. For example the vibrations may be generated by the displacement of the platform on a rough surface, such as pavement for example.

According to another aspect, the disclosure provides a method of positioning work parts 3 on a platform 1, the method including the following steps:

grab 101 a work part from a storing place;

place 102 the work part on the inclined plane 2, 2' within the angular sector S formed by the first and second direction D1, D2, so that the work part is driven by its weight downwards with respect to the slope of the inclined plane towards an intersection of the first direction (D1) and the second direction (D2), in a manufacturing station, grab 103 the work part from the platform in a repeatable known position determined by the inclined surface and the first direction D1 and the second direction D2.

The invention claimed is:

1. A platform for conveying a plurality of work parts in a sequence of manufacturing stations, the platform being mobile and comprising:

one or more inclined surfaces separately extending from a platform; and a plurality of sets of two elements attached to a first inclined surface of the one or more inclined surfaces, each element of the plurality of sets of two elements being attached to the first inclined surface, one element of each set extending along a first plane and the other element of each set extending along a second plane, the first plane and the second plane crossing the first inclined surface, an intersection of the first plane with the first inclined surface defining a first direction, the first direction being oriented upwards with respect to a slope of the first inclined surface, an intersection of the second plane with the first inclined surface defining a second direction, the second direction being oriented upwards with respect to the slope of the first inclined surface, the first direction and the second direction delimiting an angular sector, the two elements of each set intersecting at a corner and forming the angular sector, so that a work part placed on the first inclined surface within the angular sector is driven by its weight downwards with respect to the slope of the first inclined surface towards an intersection of the first direction and the second direction, wherein the plurality of sets of two elements are each configured to hold at least one of the plurality of work parts received in the angular sector due to the weight of the at least one of the plurality of work parts pressing against the two elements during conveying of the plurality of work parts in the sequence of manufacturing stations.

2. The platform according to claim 1, wherein a vertical plane intersects the first inclined surface along a third direction oriented upwards with respect to an inclination of the first inclined surface, the third direction being within the angular sector.

3. The platform according to claim 1, wherein the platform comprises at least two inclined surfaces and each element of at least another set of two elements being attached to a second of the at least two inclined surfaces.

4. The platform according to claim 1, wherein each inclined surface is coated with a material, the material configured to enhance sliding of each work part downwards along each inclined surface, when each work part is placed on each inclined surface.

5. The platform according to claim 4, wherein the material has a coefficient of friction that is a function of an inclination of each inclined surface.

6. The platform according to claim 1, wherein the platform is configured to receive vibrations that enhance sliding of each work part downwards along each inclined surface or each element of the sets of two elements, when each work part is placed on each inclined surface.

7. The platform according to claim 1, wherein the platform is autoguided.

8. The platform according to claim 1, wherein the sequence of manufacturing stations is an automotive manufacturing assembly line.

9. The platform according to claim 1, wherein each element of each set of two elements comprises rolling rollers or rolling balls configured to enhance sliding of each work part downwards along each element, when each work part is placed on each inclined surface.

10. The platform according to claim 1, wherein each inclined surface includes rolling rollers or rolling balls to enhance sliding of each work part downwards along each inclined surface, when each work part is placed on each inclined surface.

11. A method for positioning work parts on the platform according to claim 1, the method comprising:

grabbing a work part from a storing place;

placing the work part on the first inclined surface within the angular sector of one of the sets of two elements, so that the work part is driven by its weight downwards with respect to the slope of the first inclined surface towards the intersection of the first direction and the second direction of the one of the sets of two elements; and in a manufacturing station, grabbing the work part from the platform in a repeatable known position determined by the first inclined surface, the first direction, and the second direction.

12. The method according to claim 8, wherein placing the work part further comprises: enhancing sliding of the work part downwards along the first inclined surface and/or each element of the one of the sets of two elements, when the work part is placed on the first inclined surface, by:

positioning the platform on a surface; and subjecting the platform to vibrations generated from displacement of the platform on the surface.

* * * * *